(12) United States Patent
Larivé et al.

(10) Patent No.: US 8,975,798 B1
(45) Date of Patent: Mar. 10, 2015

(54) METHOD FOR ATTENUATING BEARING CURRENT IN A ROTATING ELECTRICAL DEVICE AND SYSTEM THEREFOR

(71) Applicants: René Larivé, Grand-Mere (CA); Martin Tanguay, Saint-Boniface (CA); Sylvain Larivé, Grand-Mere (CA)

(72) Inventors: René Larivé, Grand-Mere (CA); Martin Tanguay, Saint-Boniface (CA); Sylvain Larivé, Grand-Mere (CA)

( * ) Notice: Subject to any disclaimer, the term of this patent is extended or adjusted under 35 U.S.C. 154(b) by 0 days.

(21) Appl. No.: 14/093,579

(22) Filed: Dec. 2, 2013

Related U.S. Application Data

(60) Provisional application No. 61/853,852, filed on Apr. 15, 2013.

(51) Int. Cl.
*H02K 11/00* (2006.01)

(52) U.S. Cl.
CPC .................................. *H02K 11/0005* (2013.01)

USPC ............................................................ 310/90

(58) Field of Classification Search
USPC .................... 310/72, 90, 260, 270, 112–114
See application file for complete search history.

(56) References Cited

U.S. PATENT DOCUMENTS

| | | | | |
|---|---|---|---|---|
| 6,091,173 A * | 7/2000 | Byrd | ............................. | 310/85 |
| 6,154,013 A * | 11/2000 | Caamano | ....................... | 322/89 |
| 6,191,517 B1 * | 2/2001 | Radovsky | ...................... | 310/162 |
| 6,762,526 B2 * | 7/2004 | Isozaki et al. | ................ | 310/112 |
| 7,291,958 B2 * | 11/2007 | Dombrovski | ............. | 310/261.1 |
| 7,973,446 B2 * | 7/2011 | Calley et al. | .......... | 310/216.061 |
| 8,115,364 B2 * | 2/2012 | Minowa et al. | ............... | 310/268 |

* cited by examiner

*Primary Examiner* — Dang Le
(74) *Attorney, Agent, or Firm* — Ted Masters

(57) ABSTRACT

A method and system for reducing bearing failure in a rotating electrical device includes installing a magnetic core around the rotor shaft between the rotor and the bearing. The magnetic core creates an electrical impedance which reduces the current which flows through the bearings, and therefore reduces bearing failure.

4 Claims, 7 Drawing Sheets

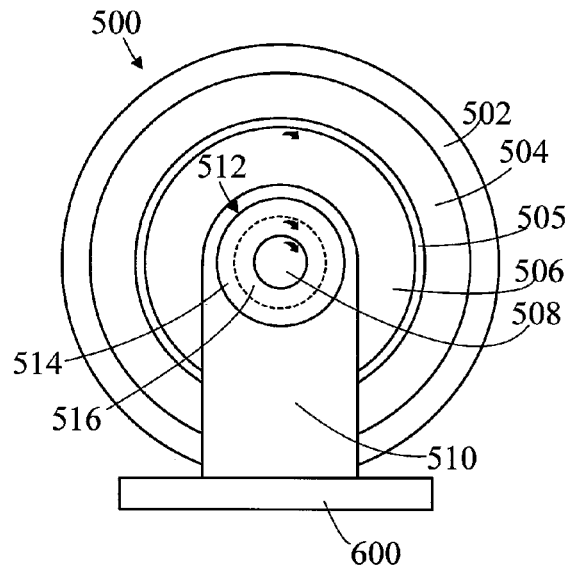
Fig_1
PRIOR ART
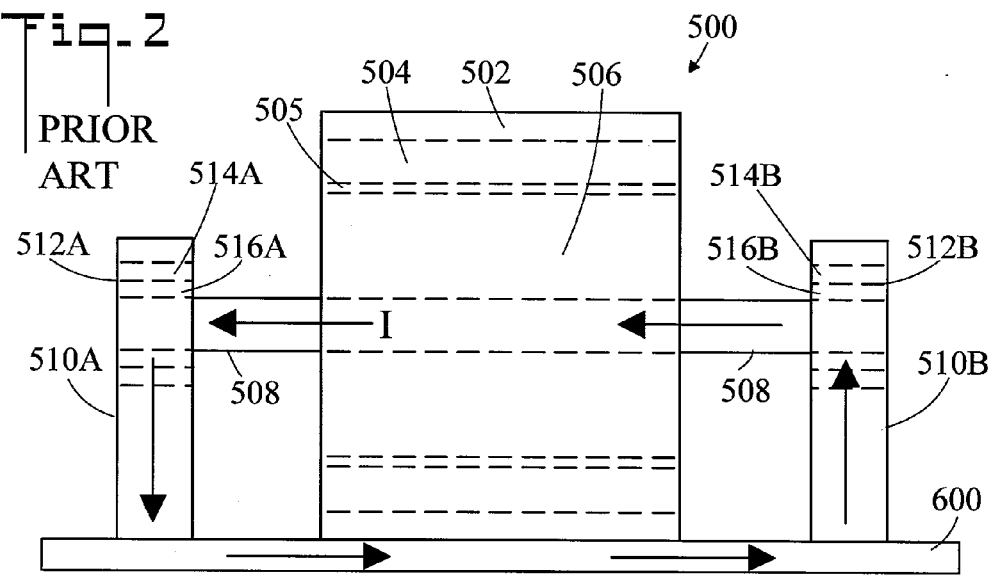
Fig_2
PRIOR ART

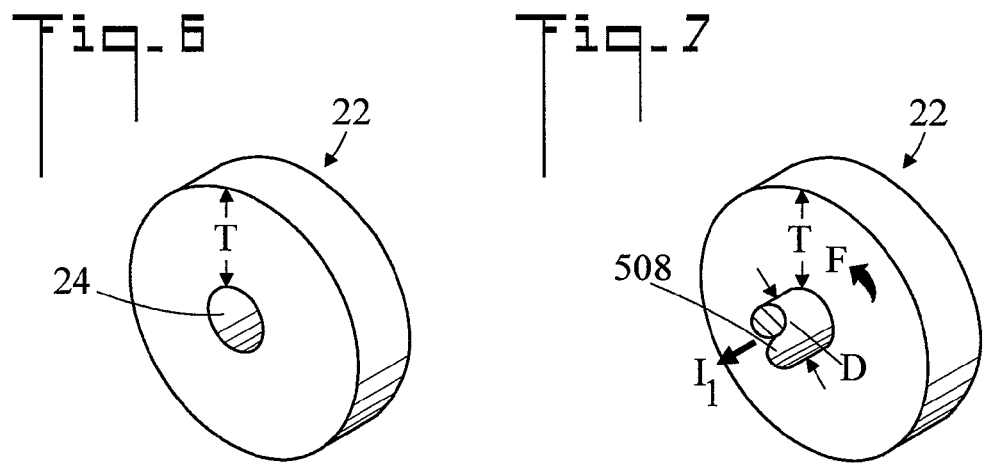
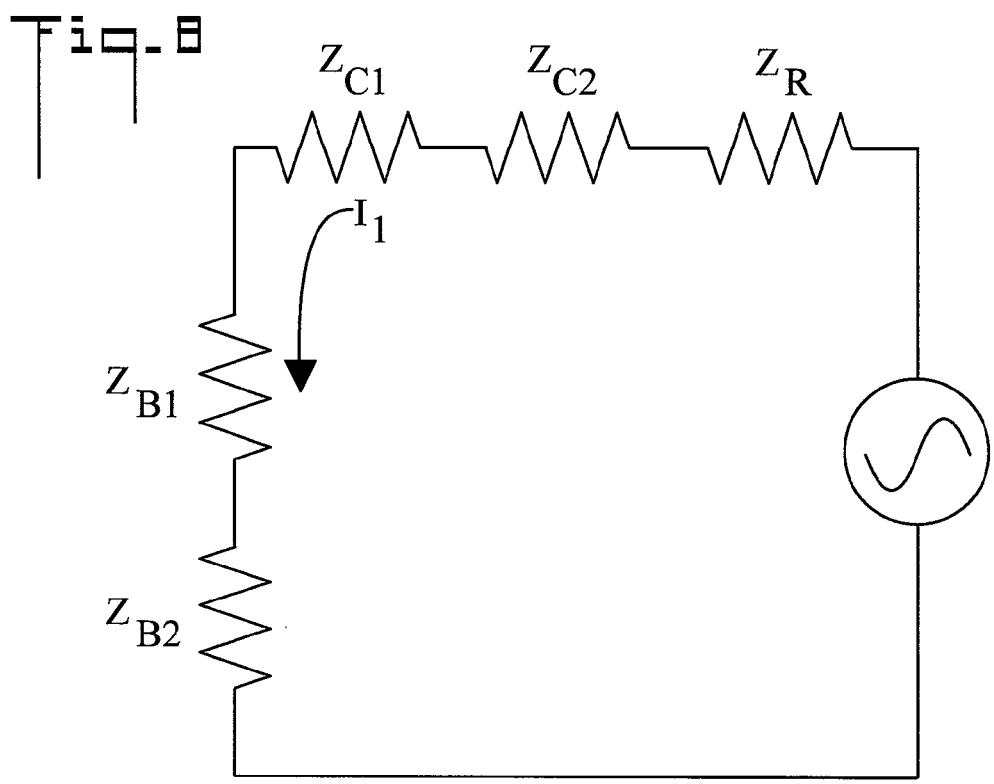

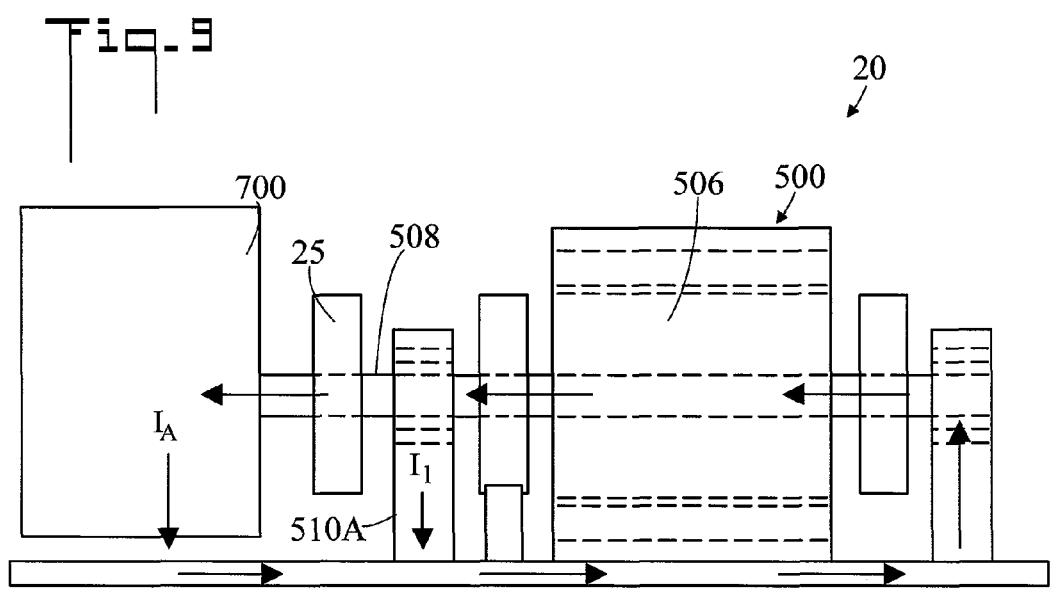

ROLL
OF TAPE

METHOD FOR ATTENUATING BEARING CURRENT IN A ROTATING ELECTRICAL DEVICE AND SYSTEM THEREFOR

CROSS REFERENCE TO RELATED APPLICATION

This application claims the filing benefit under 35 U.S.C. §119(e) of U.S. Provisional Application No. 61/853,852 filed Apr. 15, 2013, which is hereby incorporated by reference.

TECHNICAL FIELD

The present invention pertains generally to premature bearings failures in rotating electrical devices such as AC induction motors, alternators, generators, turbines and induction heated rolls, and more particularly to a method and system for attenuating the current which circulates through the bearings and which contributes to premature bearing failure.

BACKGROUND OF THE INVENTION

Published literature from manufacturers and users teaches that the bearings of AC induction motors powered from variable frequency drives are adversely affected by electrical current which is allowed to circulate through the motor shaft and the bearings. In recent years, the incidence of premature bearing failures in AC induction motors has increased because the quantity of motors powered from variable frequency drives has been increasing steadily. The problem has also been getting worse with the introduction of faster switching power electronics which allows better speed control by operating at higher operating frequencies to generate sinusoidal waveforms to drive the motor. Because variable frequency drives use pulse switching techniques to provide a sinusoidal waveforms of variable frequency which is used to feed the motor stator field coils, the presence of faster switching waveforms allows more current to be generated in the motor rotor, such current being available to circulate to the motor frame by going through the bearings. The mechanism of failure of the bearings in induction motors and similar apparatus is identified as electrical arcing between the bearing races and its rotating balls or rollers. When electrical arcing occurs between the inner or outer race of a bearing, the energy in the electrical arc creates tiny pits in the bearing race and in the bearings, thereby initiating a self-sustaining mechanical destructive sequence where the pits generate more possibilities of arcing because of the surface deterioration of the metal.

In response to a continuously increasing number of electrical current related bearing failures in motors, the industry has developed a number of bearing current mitigating techniques associated with the utilization of variable frequency drive driven motors.

Stator coil design solutions involve reducing bearing current levels through coil design, namely by reducing the electrical coupling between the stator and the rotor of the motor. The level of current made available to flow through the bearings of an AC motor is affected by the balancing of the magnetic field generated by each of the stator coils. Coil design solutions, such as electrostatic shielding which are aimed at reducing the level of available bearing current have practical limitations. For AC induction motors, the limitations imposed on the design of field coils and their magnetic cores which generate very low levels of bearing current is the physical and electrical configuration of the field coils. Coil and core design options in motors are restricted by the need to provide electrical windings wound in physically opposite positions around the periphery of the motor frame. Winding and core design which would insure that no shaft current is generated in the rotor has been so far impossible to realize.

Bearing electrical isolation solutions is another bearing current mitigating approach which has been developed. This involves coating the outer housing of the bearing, most often using plasma coatings to deposit a thin layer of ceramic type material displaying a high ohmic resistance. Unfortunately, the insulating coatings materials are brittle and thus are subject to loss of isolation due to the brittle ceramic coating added to bearing housings. The same may be said of bearings using ceramic coated steel segments.

Strategic equipment grounding techniques is yet a further solution to reduce the negative effects of bearing current. The goal of strategic grounding is to provide grounding paths which tend to minimize the level of available bearing current. The effectiveness of strategic equipment grounding techniques degrades with time as electrical equipment is modified or added to new machinery and equipment in the electrical circuits attached to variable frequency drive of the motor. By providing new or different paths for the magnetic field to generate bearing currents, the current mitigating efficiency of strategic grounding locations is eventually nullified.

Shaft grounding techniques are yet another possibility for reducing the effect of bearing current by providing a path for the current to flow to ground before reaching the bearing. This requires the installation of grounding brushes installed on the motor shaft. The use of grounding brushes has limitations regarding the level of shaft current it can carry to ground while preventing shaft voltage to increase significantly. The positioning of the grounding brushes is also critical in preventing a parallel current path through the bearing. Finally, the performance of the brushes diminishes as they wear and as dirt and other contaminants negatively affect the electrical resistance of the grounding brushes.

The use of conductive grease as a bearing lubricant is yet another method used to divert shaft electrical current to ground. Conductive grease is a normal grease to which metal particles have been added in order to make it electrically conductive. Experience with conductive grease reduces the life of bearings dramatically, making this solution impractical for long term usage.

The installation of capacitance rings and arrays on the rotor shaft is yet another technique attempting to reduce the level of current available for electrical arcing across the bearing. U.S. Pat. No. 6,819,018 is an example of the utilization of such bearing current mitigation techniques. This technique increases the capacitance between rotor and the motor frame, thus creating a lower impedance path where current will preferentially flow rather than through the bearing. While somewhat effective, the limitations imposed by the size requirements and complexity of adding enough dielectric surface area to generate a significant level of capacitance from such devices makes this solution only partially effective in reducing bearing failures. In addition, extensive studies and measurements of motor bearing failures performed mainly on induction heated rolls indicate that current value is a more critical bearing damage indicator than voltage. The capacitance rings will not significantly reduce the available bearing current.

The installation of high frequency vibration damping materials of which U.S. Pat. No. 8,247,932 is a typical example aims at reducing the level of mechanical vibrations inside the bearing races, which prevents rapid interruptions of currents from causing arcing has been demonstrated to greatly reduce the incidence of current related bearing failures. However, the design of motors utilizing stator or rotor vibration damping has proven to be impractical in numerous applications.

BRIEF SUMMARY OF THE INVENTION

The present invention is directed to a method and system for attenuating bearing current which can be responsible for premature bearing failure. A magnetic core is positioned around the rotor shaft. The magnetic core creates an electrical impedance which reduces the amount of current which flow through the bearings.

According to Amperes's law, an alternating current circulating inside a conductor generates a magnetic field around the conductor. When a magnetic core is placed around the conductor, the magnetic core acts as an inductive impedance which opposes the variations of current flow in the conductor. In the present invention the rotor of an electrical device is an AC current source and the current carrying conductor is the rotor shaft. Placing a magnetic core around the rotor shaft generates impedance which opposes the variation of current flow in the shaft, thereby reducing the varying current which is available to circulate through the shaft bearings.

In accordance with an embodiment, a system for attenuating bearing current in a rotating electrical device includes (1) a rotating electrical device having a rotor which is connected to a rotating shaft, (2) a bearing mount, and (3) a bearing assembly connected between the rotating shaft and the bearing mount. A magnetic core surrounds the rotating shaft, the magnetic core disposed between the rotor and the bearing mount.

In accordance with another embodiment, the magnetic core is connected to the rotating shaft, so that as the rotating shaft rotates the magnetic core correspondingly rotates.

In accordance with another embodiment, the magnetic core is connected to the rotating shaft, so that as the rotating shaft rotates the magnetic core does not correspondingly rotate.

In accordance with another embodiment, the rotating electrical device includes a second bearing mount, a second bearing assembly is connected between the rotating shaft and the second bearing mount. A second magnetic core surrounds the rotating shaft, the second magnetic core being disposed between the rotor and the second bearing mount.

In accordance with another embodiment, the magnetic core is fabricated from a magnetic material having a relative permeability of at least 1500.

In accordance with another embodiment, the magnetic core is fabricated from a magnetic material having a relative permeability of at least 300,000.

In accordance with another embodiment, the magnetic core is fabricated from an amorphous nanocrystalline material.

In accordance with another embodiment, the magnetic core is fabricated from a sintered ferrite material.

In accordance with another embodiment, the magnetic core includes a first half core which is connectable to a second half core.

In accordance with another embodiment, the magnetic core includes a plurality of layers of a tape fabricated from a magnetic material.

In accordance with another embodiment, the rotating shaft is connected to a piece of ancillary equipment. An ancillary equipment magnetic core surrounds the rotating shaft, the ancillary equipment magnetic core being disposed between the bearing mount and the piece of ancillary equipment.

In accordance with another embodiment, a plurality of magnetic cores surround the rotating shaft, the plurality of magnetic cores being disposed between the rotor and the bearing mount.

While the description of the prior art above is focused on the current flowing through the bearings of AC induction motor powered from Variable Frequency Drives, the present invention also applies to other types of motors such as AC induction motors powered directly from the AC mains at line frequency, DC brushless motors and conventional DC motors. Additionally, the present invention proves beneficial in other types of electrical equipment using magnetic induction to generate power such as is the case for alternators and generators. The invention also prevents premature bearing failures in metal rolls being heated using induction coils.

Other embodiments, in addition to the embodiments enumerated above, will become apparent from the following detailed description, taken in conjunction with the accompanying drawings, which illustrate, by way of example, the principles of the method and system.

BRIEF DESCRIPTION OF THE DRAWINGS

FIG. 1 is an end elevation view of a prior art rotating electrical device;

FIG. 2 is a side elevation view of the prior art rotating electrical device;

FIG. 6 is a perspective view of a magnetic core;

FIG. 7 is a fragmented perspective view of the magnetic core connected to the shaft of the rotating electrical device;

FIG. 8 is a circuit diagram showing an attenuated bearing current flowing through the bearings of the system;

FIG. 9 is a side elevation view of a second embodiment of the system in which current flowing through an ancillary device is attenuated;

DETAILED DESCRIPTION OF THE INVENTION

Figure 3:
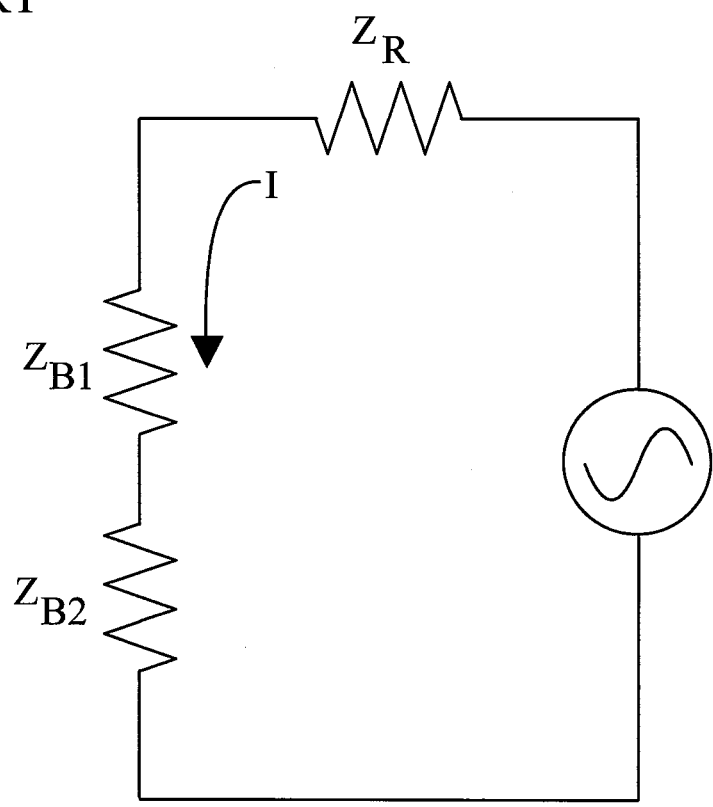
FIG. 3 is a circuit diagram showing current flowing through the bearings of the prior art rotating electrical device.

Referring initially to FIGS. 1 and 2, there are illustrated end elevation and side elevation views respectively of a prior art rotating electrical device, generally designated as 500. As shown, rotating electrical device 500 is an AC induction motor. However, rotating electrical device 500 can also be an alternator, a generator, a turbine, a DC motor, a brushless DC motor, induction heated rolls, or any other rotating electrical device 500 which has a rotor, and which can suffer from premature bearing failure due to bearing current. Rotating electrical device 500 has a motor frame 502, a stator 504, a rotor 506 connected to a rotating shaft 508 which outwardly projects in opposite directions from rotor 506, an air gap 505 between stator 504 and rotor 506, first and second bearing mounts 510A and 510B, and first and second bearings 512A and 512B having first and second outer races 514A and 524B and first and second inner races 516A and 516B. In the shown embodiment, bearings 512A and 512B are either ball or roller bearings. Stator 504 is rigidly connected to frame 502. Rotor 506 is maintained in place by first and second bearings 512A and 512B. Outside races 514A and 514B of bearings 512A and 512B are rigidly connected to bearing mounts 510A and 510B, and inner races 516A and 516B of bearings 512A and 512B are rigidly connected to rotating shaft 508. In the figure, the broken circle represents the path of rotation of inner races 516A and 516B with respect to outer race 514A and 514B of bearings 512A and 512A. Because of air gap 505, rotor 506, inner races 516A and 516B, and rotating shaft 508 are free to rotate with respect to fixed motor frame 502, stator 504, bearing mounts 510A and 510B, and outer races 514A and 514B. In FIG. 1 the arrows show which elements freely rotate. Rotating electrical device 500 is connected to a motor mount 600.

Referring to the electrical equivalent circuit of FIG. 3, when rotating electrical device 500 operates, a bearing current I flows from rotor 506 along rotating shaft 508, through first bearing 512A, though first bearing mount 510A, through motor mount 600 and/or motor frame 502, through second bearing mount 510B, through second bearing 512B, along rotating shaft 508, and back to rotor 506. This current can produce arching which causes pitting in first and second outer races 514A and 514B, in first and second inner races 516A and 516B, and in the bearings themselves, the pitting causing premature bearing failure. For example, in a typical AC induction motor fed by a modern variable frequency drive, the AC electrical impedance $Z_R$ of rotor 506 is very low; of the order of 0.04 ohms. The flow of bearing current I which is generated in rotor 506 flows though rotor impedance $Z_R$ in series with the impedances $Z_{B1}$ and $Z_{B2}$ of first and second bearings 512A and 512B. The AC impedances $Z_{B1}$ and $Z_{B2}$ of the bearings are determined by the quality of the electrical contact between the inner and outer bearing races through the ball or roller bearing are thus variable. Under normal operating conditions where the motor shaft is driving a normal load, these impedances too are very low, also of the order of 0.04 ohms. As such, the bearing current flow is essentially unrestricted and electrical arcing occurs between the bearing races when the electrical contact between the bearing races becomes discontinuous.

Figure 4:
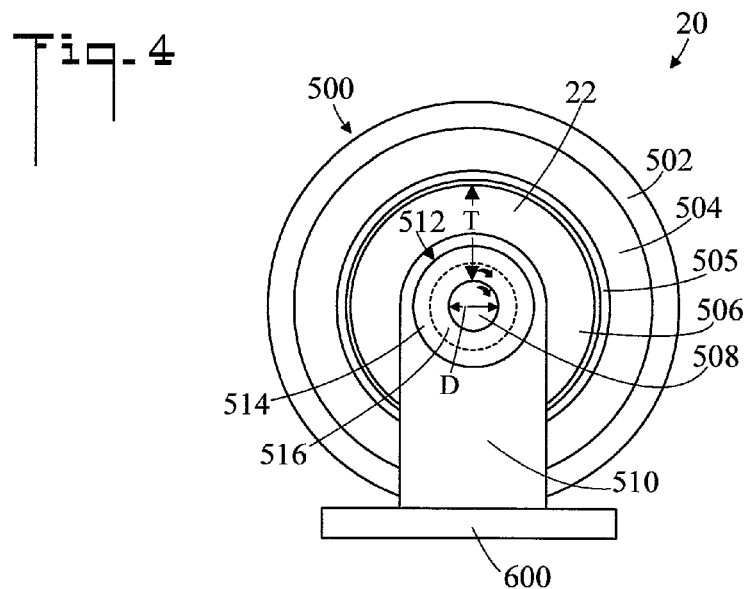
FIG. 4 is an end elevation view of a system for attenuating bearing current in a rotating electrical device in accordance with the present invention.
Figure 5:
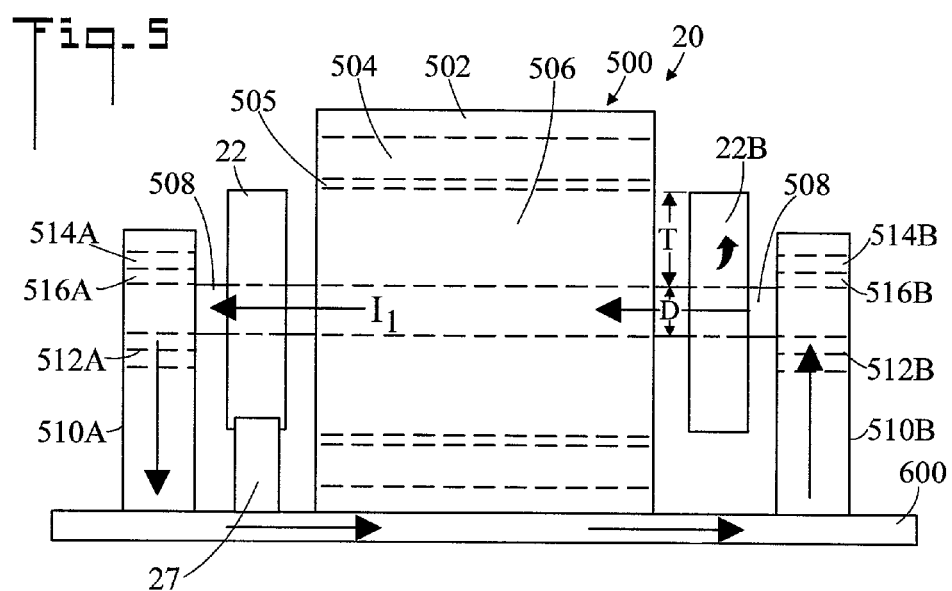
FIG. 5 is a side elevation view of the system.

FIGS. 4 and 5 are end elevation and side elevation views respectively of a system for attenuating bearing current in a rotating electrical device 500 in accordance with the present invention, generally designated as 20. System 20 includes a rotating electrical device 500 such as previously described which has a rotor 506 which is connected to a rotating shaft 508. System 20 further includes a bearing mount 510A and a bearing 512A which is connected between rotating shaft 508 and bearing mount 510A. FIGS. 4 and 5 further show motor frame 502, stator 504, an air gap 505 between stator 504 and rotor 506, a second bearing mount 510B, and a second bearing 512B, first and second bearings 512A and 512B have first and second outer races 514A and 524B and first and second inner races 516A and 516B.

A magnetic core 22 surrounds rotating shaft 508, magnetic core 22 is disposed on rotating shaft 508 between rotor 506 and bearing mount 510A. That is, magnetic core 22 is mechanically connected around rotating shaft 508. In the shown embodiment magnetic core 22 is a toroid having a hole which accepts rotating shaft 508 (refer also to FIGS. 6 and 7). Magnetic core 22 is fabricated from a highly permeable magnetic material. The bearing current which flows in rotating shaft 508 causes a magnetic field to be developed in magnetic core 22. As such, magnetic core 22 presents an inductive impedance to the flow of the bearing current. This impedance results in a greatly attenuated bearing current $I_1$ (as compared to the higher bearing current I in the prior art rotating electrical device 500 of FIGS. 1-3). The reduced bearing current $I_1$ results in reduced levels of pitting and premature bearing failure.

It of course is possible to install a magnetic core 22 on only one side of rotor 506. However, by installing magnetic cores on both sides of rotor 506, a further reduction in bearing current is achieved. As such, in the shown embodiment rotating electrical device further includes a second bearing mount 510B, and a second bearing assembly 512B which is connected between rotating shaft 508 and second bearing mount 510B. A second magnetic core 22B surrounds rotating shaft 508, second magnetic core 22B being disposed between rotor 506 and second bearing mount 510B.

In one embodiment, magnetic core 22 (or 22B) is fixedly connected to rotating shaft 508 so that as rotating shaft 508 rotates magnetic core 22 correspondingly rotates. That is, magnetic core 22 and rotating shaft 508 rotate in unison. In another embodiment, magnetic core 22 (or 22B) is rotatably connected to rotating shaft 508, so that as rotating shaft 508 rotates magnetic core 22 does not correspondingly rotate. That is, rotating shaft 508 rotates within magnetic core 22. For example, in FIG. 5, magnetic core 22B is fixedly connected to and rotates with rotating shaft 508 (as is indicated by the arrow), while magnetic core 22 is not connected to rotating shaft 508 and does not rotate therewith. In the shown embodiment, a bracket 27 holds magnetic core 22 fixedly in place and rotating shaft 508 rotates within it. It is noted that it does not matter whether magnetic core 22 (or 22B) rotates or not with respect to rotating shaft 508. The current reducing effect is the same in both configurations.

The magnetic characteristics of the material used to fabricate magnetic core 22 is important for system 20 to function properly. The level of electrical impedance created by the installation of magnetic core 22 over rotating shaft 508 is affected primarily by the relative permeability of the core material. Materials such as stainless steel and aluminum having a relative permeability below 600 fail to produce a high level of impedance under the influence of a magnetic field. Conversely, materials such as manganese based ferrite have a relative permeability above 3000, with a corresponding increase of impedance. Other types of highly magnetically permeable materials such as Permalloy and Metglas can show permeabilities above 1,000,000. It is noted that all relative permeabilities cited herein are measured at a temperature of approximately 75° F.

A Metglas 2605SA1 is an iron based magnetic core is made using ferromagnetic amorphous metal which contains boron, chromium, iron and silicon. The high magnetic susceptibility combined with low coercivity and high electrical resistance result in very low eddy current losses when subjected to medium and high frequency magnetic fields.

A Ferroxcube 3C90 soft ferrites is a very hard, and brittle ceramic fabricated from zinc and manganese components. This material exhibits a low coercivity and high electrical resistance resulting in very low eddy current losses when subjected to medium and high frequency magnetic fields.

In an embodiment, magnetic core 22 is fabricated from a magnetic material which has a relative permeability of at least 1500. In another embodiment, magnetic core 22 is fabricated from a magnetic material which has a relative permeability of at least 300,000. In one specific embodiment, magnetic core 22 is fabricated from an amorphous nanocrystalline material such as Metglas 2605SA3. In another specific embodiment, magnetic core 22 is fabricated from a sintered ferrite material such as Ferroxcube 3C90 material. It is further noted that as the relative permeability of magnetic core 22 increase, its size decreases. As such, high relative permeability magnetic material such as Metglas 2605A3 and Ferroxcube 3C90 is desired in applications where installation space is limited.

FIG. 6 is a perspective view of magnetic core 22. In the shown embodiment magnetic core 22 is a donut-shaped toroid which has a hole 24 through which rotating shaft 508 can pass (refer to FIG. 7).

FIG. 7 is a fragmented perspective view of magnetic core 22 connected to rotating shaft 508 of rotating electrical device 500. Bearing current $I_1$ flows through rotating shaft 508 and creates a magnetic field F in magnetic core 22. Also referring to FIGS. 4, 5, and 6, it is noted that magnetic core 22 has a thickness T which is greater than the diameter D of rotating shaft 508.

FIG. 8 is a circuit diagram showing an attenuated bearing current $I_1$ flowing through the bearings of system 20. This circuit is similar to that of FIG. 3, with the exception that the impedances $Z_{C1}$ and $Z_{C2}$ created by magnetic cores 22 and 22B respectively have been added. For example, in a typical induction motor fed by a modern variable frequency drive, the presence of magnetic cores 22 and 22B can increase the AC electrical impedance to a value in the order of 2 ohms. This higher impedance can reduce the level of the bearing current I by a factor of 20 or more when compared to the prior art (i.e. $I_1=I/20+$). In system 20, the flow of current which is generated in rotor 506 is limited not only by rotor impedance $Z_R$ and bearing impedances $Z_{B1}$ and $Z_{B2}$ (of first bearing 512A and second bearing 512B respectively), but is also limited by the impedance $Z_{C1}$ and $Z_{C2}$ of magnetic cores 22 and 22B respectively. The resulting reduced bearing current $I_1$ results in reduced or nonexistent arcing and pitting of the bearings. It is further noted that a substantial bearing current reduction can also be realized by using only one magnetic core (e.g. only magnetic core 22).

FIG. 9 is a side elevation view of a second embodiment of system 20 in which current flowing through an ancillary device is attenuated. Rotating shaft 508 is connected to a piece of ancillary equipment 700 such as a gear box. An ancillary equipment magnetic core 25 surrounds rotating shaft 508. Ancillary equipment magnetic core 25 is disposed between first bearing mount 510A and piece of ancillary equipment 700, and thereby attenuates any current $I_A$ which might flow from rotor 506 to ground through ancillary equipment 700.

Figure 10:
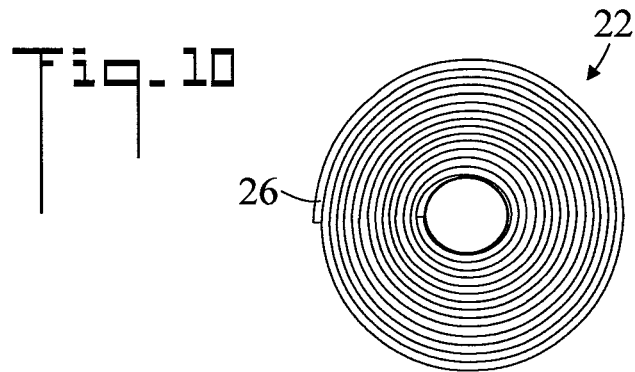
FIG. 10 is a side elevation view of one embodiment of the magnetic core which is fabricated from a plurality of layers of a tape which is fabricated from a magnetic material.

FIG. 10 is a side elevation view of one embodiment of magnetic core 22 which is fabricated from a plurality of layers of a tape 26 which is fabricated from a magnetic material. Layers of tape 26 are circumferentially wrapped on top of one another in spiral fashion to form magnetic core 22. Tape 26 can have a thickness of as little as 0.001 inches, and as such many layers of tape 26 are required to form magnetic core 22. In an embodiment, tape 26 is composed of amorphous material manufactured from a nanocrystalline material such as Metglas 2605SA1.

Figure 11:
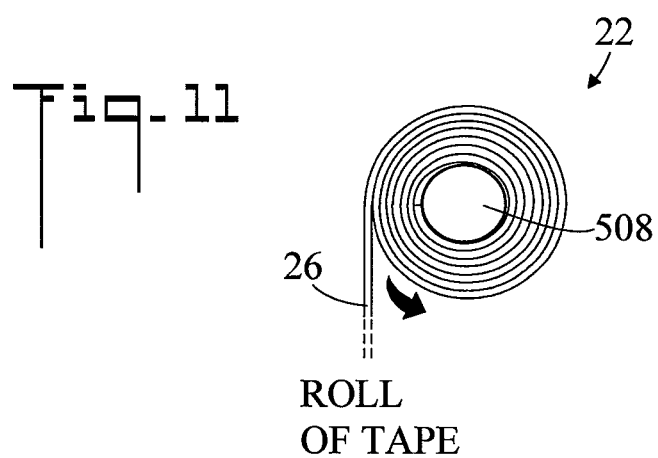
FIG. 11 is a side elevation view of layers of the tape being wrapped around the shaft of the rotating electrical device to form the magnetic core.

FIG. 11 is a side elevation view of layers of tape 26 being wrapped around rotating shaft 508 of rotating electrical device 500 to form magnetic core 22. The wrapping process has the advantage that magnetic core 22 can be installed without disassembling rotating electrical device 500.

Figure 12:
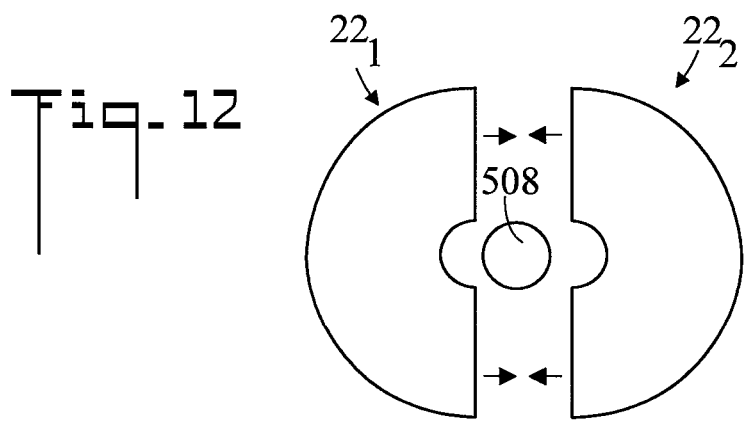
FIG. 12 is a side elevation view of first and second half cores which are connectable to form the magnetic core; and, FIG. 13 is a side elevation view of an embodiment which utilizes a plurality of magnetic cores.

FIG. 12 is a side elevation view of first and second half cores $22_1$ and $22_2$ respectively which are connectable to form magnetic core 22. This embodiment also has the advantage of not requiring disassembly of rotating electrical device 500 to effect installation of magnetic core 22. Half cores $22_1$ and $22_2$ are simply positioned around rotating shaft 508.

Figure 13:
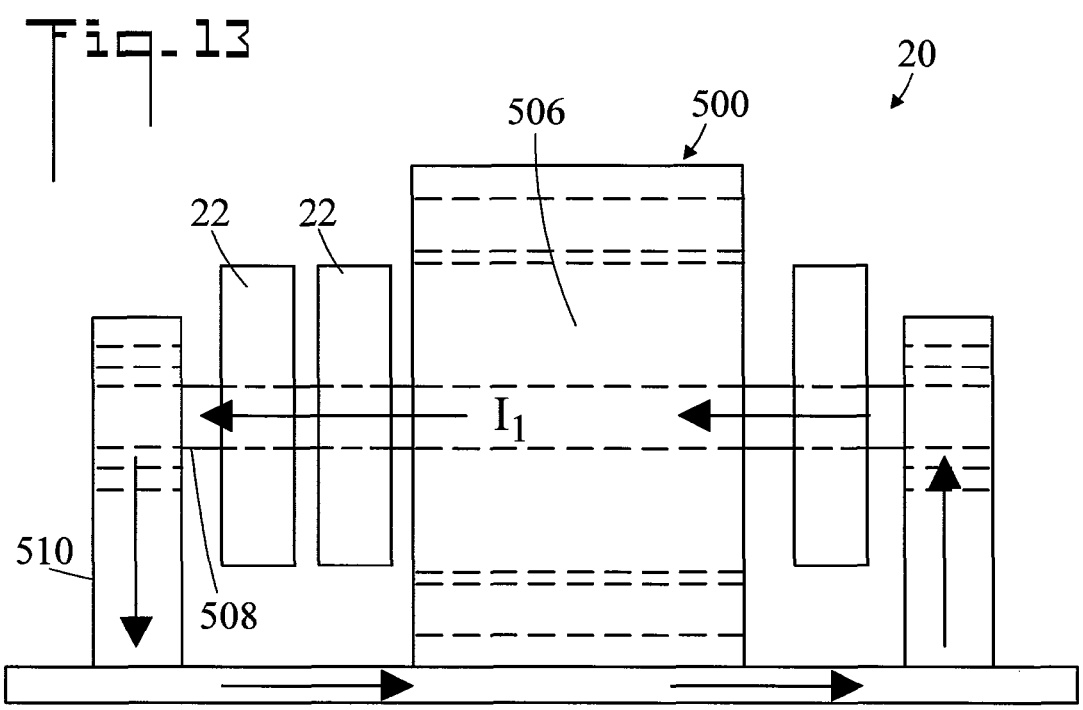

FIG. 13 is a side elevation view of an embodiment which utilizes a plurality of magnetic cores 22. The plurality of magnetic cores surround rotating shaft 508, and are disposed between rotor 508 and bearing mount 510A. That is, in this embodiment more than one core 22 is disposed on the same side of rotor 506.

In terms of use, a method for attenuating bearing current in a rotating electrical device 500 includes: (refer to FIGS. 1-13)

(a) providing a rotating electrical device 500 including:
 a rotor 506 which is connected to a rotating shaft 508;
 a bearing mount 510A;
 a bearing assembly 512A connected between rotating shaft 508 and bearing mount 510A;

(b) providing a magnetic core 22; and, (c) connecting magnetic core 22 around rotating shaft 508 wherein magnetic core 22 is disposed between rotor 506 and bearing mount 510 A.

The further including:
in (c), magnetic core 22 connected to rotating shaft 508 so that as rotating shaft 508 rotates magnetic core 22 correspondingly rotates.

The method further including:
in (c), magnetic core 22 connected to rotating shaft 508, so that as rotating shaft 508 rotates magnetic core 22 does not correspondingly rotate.

The method further including:
in (a), providing a second bearing mount 510B;
in (a), providing a second bearing assembly 512B connected between rotating shaft 508 and second bearing mount 510B;
in (b), providing a second magnetic core 22B; and,
connecting second magnetic core 22B around rotating shaft 508 wherein second magnetic core 22B is disposed between rotor 506 and second bearing mount 510B.

The method further including:
in (b), magnetic core 22 fabricated from a magnetic material having a relative permeability of at least 1500.

The method further including:
in (b), magnetic core 22 fabricated from a magnetic material having a relative permeability of at least 300,000.

The method further including:
in (b), magnetic core 22 fabricated from an amorphous nanocrystalline material.

The method further including:
in (b), magnetic core 22 fabricated from a sintered ferrite material.

The method further including:
in (b), magnetic core 22 including a first half core $22_1$ which is connectable to a second half core $22_2$; and,
in (b), connecting first half core $22_1$ to second half core $22_2$ so that the connected first $22_1$ and second $22_2$ half cores surround rotating shaft 508 and are disposed between rotor 506 and bearing mount 510A.

The method further including:
in (b), magnetic core 22 including a plurality of layers of a tape 26 fabricated from a magnetic material.

The method further including:
in (a), providing a piece of ancillary equipment 700 which is connected to rotating shaft 508;
in (a), providing an ancillary equipment magnetic core 25; and,
connecting ancillary equipment magnetic core 25 around rotating shaft 508 wherein ancillary equipment magnetic core 25 is disposed between bearing mount 510A and piece of ancillary equipment 700.

The method further including:

in (b), providing a plurality of magnetic cores 22; and, in (c), connecting the plurality of magnetic cores 22 around rotating shaft 508 wherein the plurality of magnetic core 22 are disposed between rotor 506 and bearing mount 510A.

In another embodiment, a method for attenuating bearing current in a rotating electrical device 500 includes; (refer to FIGS. 1-13)

(a) providing a rotating electrical device 500 including:
a rotor 506 which is connected to a rotating shaft 508;
a bearing mount 510A;
a bearing assembly 512A connected between rotating shaft 508 and bearing mount 510A;

(b) providing a roll of tape 26 fabricated from a magnetic material; and, (c) wrapping a plurality of tape layers of tape 26 around rotating shaft 508.

The embodiments of the method and system described herein are exemplary and numerous modifications, combinations, variations, and rearrangements can be readily envisioned to achieve an equivalent result, all of which are intended to be embraced within the scope of the appended claims. Further, nothing in the above-provided discussions of the method and system should be construed as limiting the invention to a particular embodiment or combination of embodiments. The scope of the invention is defined by the appended claims.

We claim:

1. A method for attenuating bearing current in a rotating electrical device, comprising:
    (a) providing a rotating electrical device including:
        a rotor which is connected to a rotating shaft;
        a bearing mount;
        a bearing assembly disposed between said rotating shaft and said bearing mount, said rotating shaft having an exposed part disposed between said rotor and said bearing assembly;
    (b) providing a magnetic core;
    (c) positioning said magnetic core around said exposed part of said rotating shaft;
    in (b), said magnetic core including a first semicircular half core which has a semicircular groove which accepts half of said rotating shaft;
    in (b), said magnetic core also including a second semicircular half core which has a semicircular groove which accepts half of said rotating shaft, said first and second semicircular half cores connectable so that they surround said rotating shaft; and,
    in (c), connecting said first semicircular half core to said second semicircular half core around said rotating shaft.

2. A method for attenuating bearing current in a rotating electrical device, comprising:
    (a) providing a rotating electrical device including:
        a rotor which is connected to a rotating shaft;
        a bearing mount;
        a bearing assembly disposed between said rotating shaft and said bearing mount, said rotating shaft having an exposed part disposed between said rotor and said bearing assembly;
    (b) providing a magnetic core;
    (c) positioning said magnetic core around said exposed part of said rotating shaft;
    providing a piece of ancillary equipment which is connected to said rotating shaft, said piece of ancillary equipment disposed along said rotating shaft on an opposite side of said bearing mount from said rotor, said piece of ancillary equipment residing in spaced apart relationship with said bearing mount;
    providing an ancillary equipment magnetic core; and,
    positioning said ancillary equipment magnetic core around said rotating shaft wherein said ancillary equipment magnetic core is disposed between said bearing mount and said piece of ancillary equipment.

3. A system for attenuating bearing current in a rotating electrical device, comprising:
    a rotating electrical device having (1) a rotor which is connected to a rotating shaft, (2) a bearing mount, and (3) a bearing assembly disposed between said rotating shaft and said bearing mount;
    said rotating shaft having an exposed part disposed between said rotor and said bearing assembly;
    a magnetic core positioned around said exposed part of said rotating shaft;
    said magnetic core including a first semicircular half core which has a semicircular groove which accepts half of said rotating shaft;
    said magnetic core also including a second semicircular half core which has a semicircular groove which accepts half of said rotating shaft; and,
    said first and second semicircular half cores connectable so that they surround said rotting shaft.

4. A system for attenuating bearing current in a rotating electrical device, comprising:
    a rotating electrical device having (1) a rotor which is connected to a rotating shaft, (2) a bearing mount, and (3) a bearing assembly disposed between said rotating shaft and said bearing mount;
    said rotating shaft having an exposed part disposed between said rotor and said bearing assembly;
    a magnetic core positioned around said exposed part of said rotating shaft;
    said rotating shaft connected to a piece of ancillary equipment which is disposed along said rotating shaft on an opposite side of said bearing mount from said rotor, said piece of ancillary equipment residing in spaced apart relationship with said bearing mount; and,
    an ancillary equipment magnetic core surrounding said rotating shaft, said ancillary equipment magnetic core disposed between said bearing mount and said piece of ancillary equipment.

* * * * *